(12) United States Patent
Sugiyama

(10) Patent No.: US 10,921,928 B2
(45) Date of Patent: Feb. 16, 2021

(54) INPUT APPARATUS AND INPUT SYSTEM

(71) Applicant: SHARP KABUSHIKI KAISHA, Sakai (JP)

(72) Inventor: Kohichi Sugiyama, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/793,598

(22) Filed: Feb. 18, 2020

(65) Prior Publication Data

US 2020/0272298 A1 Aug. 27, 2020

(30) Foreign Application Priority Data

Feb. 22, 2019 (JP) .............................. JP2019-030175
Jun. 14, 2019 (JP) .............................. JP2019-110740

(51) Int. Cl.
*G06F 3/041* (2006.01)
*G06F 3/0354* (2013.01)
*G06F 3/042* (2006.01)

(52) U.S. Cl.
CPC ...... *G06F 3/04162* (2019.05); *G06F 3/03545* (2013.01); *G06F 3/0421* (2013.01); *G06F 3/0425* (2013.01)

(58) Field of Classification Search
None
See application file for complete search history.

(56) References Cited

U.S. PATENT DOCUMENTS

2015/0346825 A1* 12/2015 Chiu .................... G06F 3/0317
345/158
2018/0217683 A1* 8/2018 Kobayashi ............. G06F 3/041

FOREIGN PATENT DOCUMENTS

JP 2017-091336 A 5/2017

* cited by examiner

*Primary Examiner* — Amare Mengistu
*Assistant Examiner* — Sarvesh J Nadkarni
(74) *Attorney, Agent, or Firm* — ScienBiziP, P.C.

(57) ABSTRACT

An input apparatus includes a coordinate detector that detects position coordinates of an input on an input screen by an input tool, an image-capturing device that captures an image of a marker disposed on the input tool and indicating information on an attribute of the input tool, an input-tool identifier that identifies the attribute on the basis of the image of the marker captured by the image-capturing device, and an input-data generator that generates input data of the input tool on the basis of the position coordinates detected by the coordinate detector and the attribute identified by the input-tool identifier.

18 Claims, 13 Drawing Sheets

FIG. 3

| MARKER | TYPE OF INPUT TOOL | WRITING COLOR |
|---|---|---|
| P1 | TOUCH PEN | BLACK |
| P2 | TOUCH PEN | RED |
| P3 | TOUCH PEN | BLUE |
| P4 | ERASER | — |
| ... | ... | ... |

INPUT APPARATUS AND INPUT SYSTEM

INCORPORATION BY REFERENCE

This application is based upon and claims the benefit of priority from the corresponding Japanese Patent Applications No. 2019-030175 filed on Feb. 22, 2019, and No. 2019-110740 filed on Jun. 14, 2019, the entire contents of which are incorporated herein by reference.

BACKGROUND OF THE INVENTION

Field of the Invention

The disclosure relates to an input apparatus that has an input screen for receiving an input on the input screen by an input tool and an input system.

Description of the Background Art

Input apparatuses have become widespread that have touch panels provided with input screens for receiving handwriting input on the input screen by writing tools, such as stylus pens. A technique for such an input apparatus is known that determines the type of the writing tool. For example, there is a known technique for a touch input apparatus that receives an input by a stylus pen. In this technique, an image of a tip of the pen is captured using a camera to specify the color of the tip of the pen, and the color corresponding to the color of the tip of the pen is displayed on a display unit.

A touch input apparatus of the prior art includes a controller equipped with an image analysis engine. The controller analyzes a captured image using the image analysis engine. The controller determines whether an image of a stylus pen is included in the captured image on the basis of the analysis result of the captured image. If the captured image includes an image of a stylus pen, the controller specifies the color of the tip of the pen of the stylus pen.

However, the prior art requires advanced image analysis for the process of determining whether an image of a stylus pen is included in a captured image on the basis of the analysis result of the captured image, determining the position of the tip of the pen of the stylus pen in the captured image if an image of the stylus pen is included in the captured image, and specifying the color of the tip of the pen.

The tip of the pen appears significantly differently in the captured image depending the condition of the pen, including the position of the pen, the angle of the pen, the background image of the pen, and the environment of image capturing. For this reason, it is difficult to accurately specify the position and the color of the tip of the pen.

SUMMARY OF THE INVENTION

An object of the disclosure is to provide an input apparatus and an input system that can accurately determine the type of an input tool through a simple configuration.

An input apparatus according to an aspect of the disclosure has an input screen that receives an input on the input screen by an input tool, the input apparatus including a coordinate detector that detects position coordinates on the input screen receiving an input by the input tool, an image-capturing device that captures an image of a marker disposed on the input tool, the marker indicating information on an attribute of the input tool, an input-tool identifier that identifies the attribute based on the image of the marker captured by the image-capturing device, and an input-data generator that generates input data of the input tool based on the position coordinates detected by the coordinate detector and the attribute identified by the input-tool identifier.

An input system according to an aspect of the disclosure includes an input tool, an input apparatus having an input screen that receives an input on the input screen by an input tool, a coordinate detector that detects position coordinates on the input screen receiving an input by the input tool, an image-capturing device that captures an image of a marker disposed on the input tool, the marker indicating information on an attribute of the input tool, an input-tool identifier that identifies the attribute based on the image of the marker captured by the image-capturing device, and an input-data generator that generates input data of the input tool based on the position coordinates detected by the coordinate detector and the attribute identified by the input-tool identifier.

The disclosure provides an input apparatus and an input system that can accurately determine the type of an input tool through a simple configuration.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 3 illustrates an example of attribute information used in the input system according to an embodiment of the disclosure.

DESCRIPTION OF THE PREFERRED EMBODIMENTS

Embodiments of the disclosure will now be described with reference to the accompanying drawings. The following embodiments are examples that embody the present disclosure, and do not limit the technical scope of the disclosure.

The input apparatus according to the disclosure is an information processor that has a touch input screen for receiving an input by an input tool. The input screen is any medium that is able to receives information through an input by an input tool. Examples of such media include a touch panel equipped with a display, such as an electronic blackboard (electronic board), and a board such as a white board or a blackboard. The input tool is any type of writing tool. Examples of such writing tools include pens, such as stylus pen, an electronic pen, and a marker pen, an eraser, and a brush. The touch input is an input the input screen by the input tool. The touch input includes, for example, writing with the pen or the brush, and erasing of handwriting (characters or the like) with the eraser. In the embodiment of the disclosure, the input screen is mainly exemplified by a touch panel equipped with a display panel (hereinafter, referred to as a "touch panel"), and the input tool is mainly exemplified by a stylus pen (hereinafter, referred to as a "touch pen").

Figure 1:
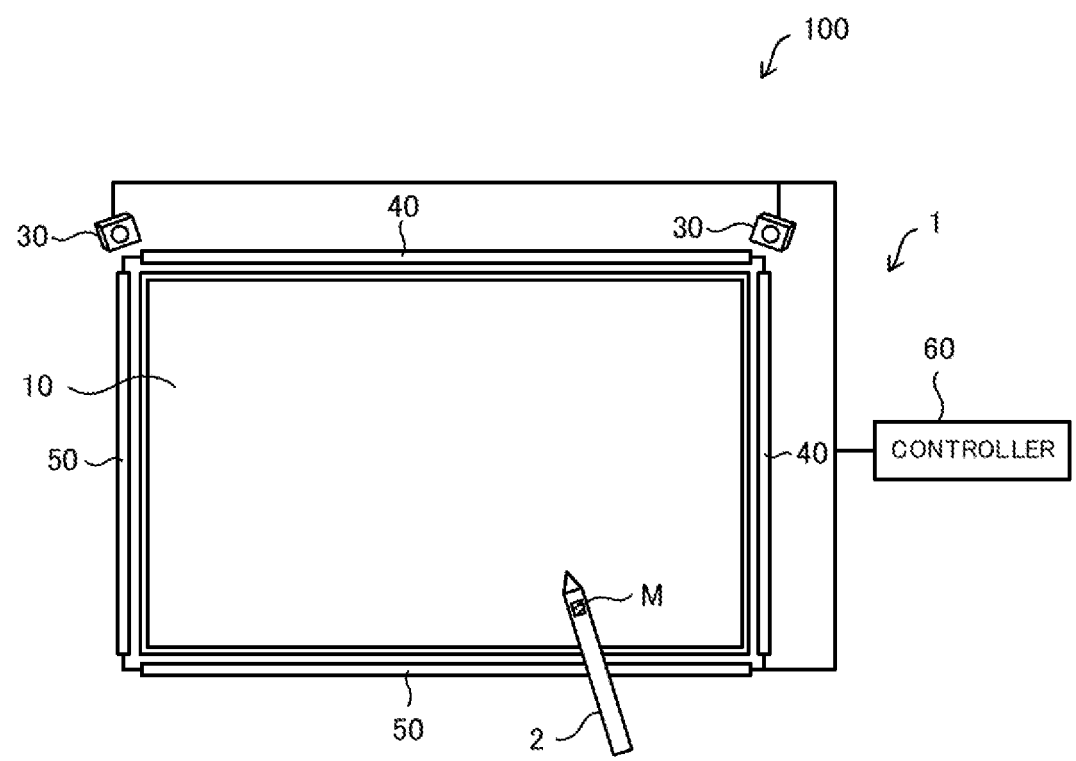
FIG. 1 illustrates the overall configuration of an input system according to an embodiment of the disclosure.

FIG. 1 illustrates the configuration of an input system 100 according to an embodiment of the disclosure. The input system 100 includes an input apparatus 1 and a touch pen 2. The input apparatus 1 is an example of the input apparatus according to the disclosure. The touch pen 2 is an example of the input tool according to the disclosure. The input apparatus 1 can detect the position (position coordinates) of the touch input on the input screen of the touch panel 10 by the touch pen 2 of a user, detect the attribute (for example, writing color) of the touch pen 2, and thereby define the information corresponding to the touch input in the writing color at a position corresponding to the position coordinates on the display panel.

Figure 2:
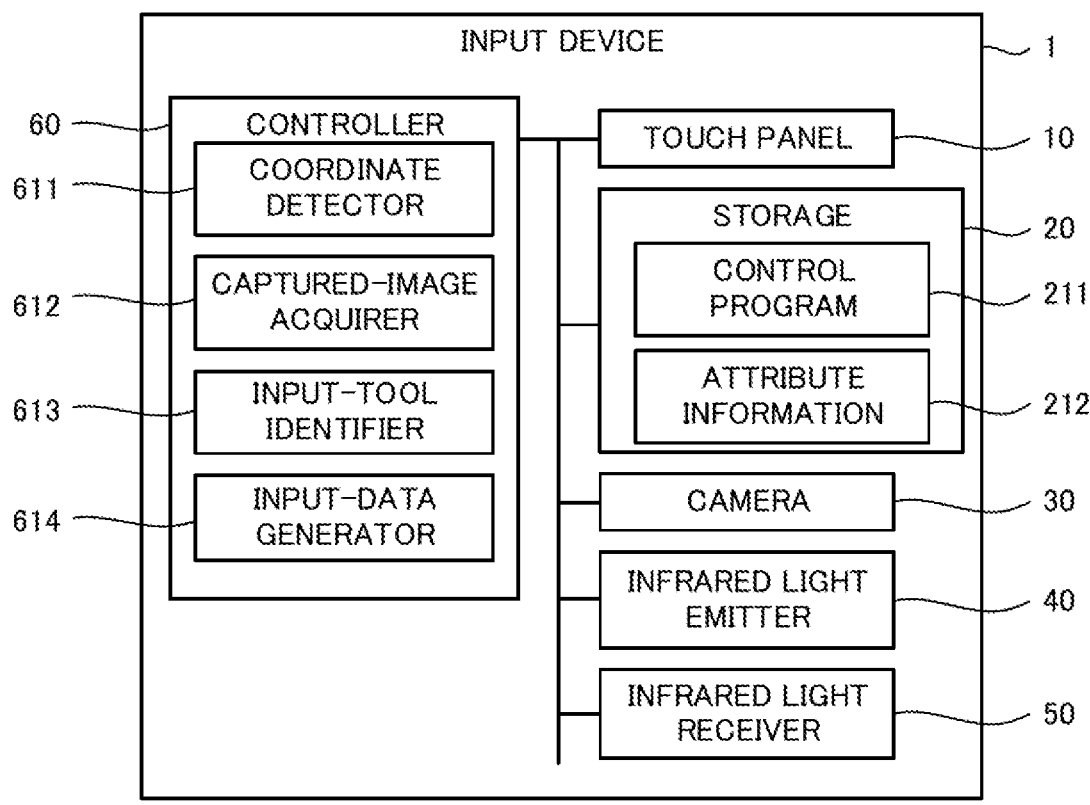
FIG. 2 is a functional block diagram illustrating the configuration of an input apparatus according to an embodiment of the disclosure.

FIG. 2 is a functional block diagram illustrating the configuration of the input apparatus 1. The input apparatus 1 includes a touch panel 10, a storage 20, cameras 30, infrared light emitters 40, infrared light receivers 50, and a controller 60.

The touch panel 10 has an input screen that receives a touch input on the input screen of the touch panel 10 by the touch pen 2 of a user. The touch panel 10 may be an infrared touch panel, a capacitive touch panel, or a pressure-sensitive touch panel. Although details will be described below, the touch panel according to the disclosure is preferably an infrared touch panel. The touch panel 10 may be disposed on front face of the display panel or may be built in the display panel. The touch panel 10 and the display panel may be disposed remote from each other and be able to communicate with each other.

The storage 20 is a non-volatile memory, such as a hard disk drive (HDD) or a solid-state drive (SSD), that stores various data items. In specific, the storage 20 stores data such as attribute information 212.

In specific, the storage 20 stores the attribute information 212 regarding the attributes of the input tool. In the attribute information 212, attributes, such as the type, color, thickness, and shape of the input tool, are registered for each marker M disposed on the input tool. The attributes includes information on at least one of the type of input tool (touch pen, eraser, brush, etc.), the writing color (input color) corresponding to the touch pen 2, the thickness of the tip of the touch pen 2 (written characters), and the shape of the tip of the touch pen 2.

FIG. 3 illustrates an example of the attribute information 212. The characters "P1" to "P4" in FIG. 3 indicate marker patterns of the markers M. FIG. 3 illustrates the "type" of the input tool and the "writing color" of the touch pen 2 as examples of the attributes. A black touch pen 2 is associated with the marker M of the marker pattern P1. A red touch pen 2 is associated with the marker M of the marker pattern P2. A blue touch pen 2 is associated with the marker M of the marker pattern P3. The marker M of the marker pattern P4 is associated with the eraser 3.

Figure 4A:
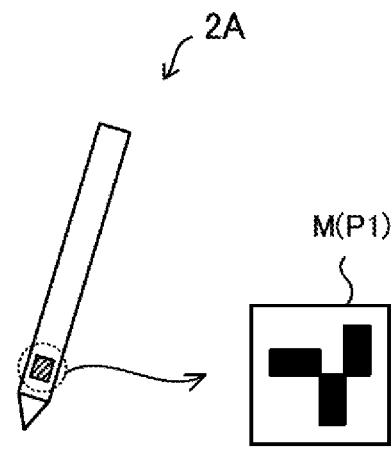
FIG. 4A illustrates an example configuration of a touch pen according to an embodiment of the disclosure.
Figure 4B:
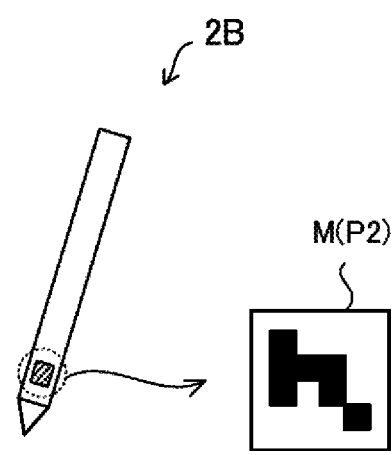
FIG. 4B illustrates another example configuration of a touch pen according to an embodiment of the disclosure.
Figure 4C:
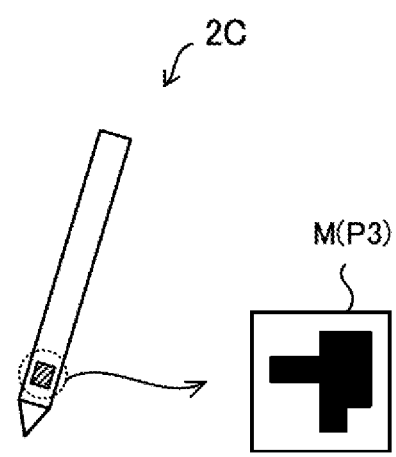
FIG. 4C illustrates another example configuration of a touch pen according to an embodiment of the disclosure.

A specific example of the input tool will now be described. FIGS. 4A to 4C illustrate the configurations of the touch pen 2. A black touch pen 2A illustrated in FIG. 4A is associated with the marker M of the marker pattern P1. A red touch pen 2B illustrated in FIG. 4B is associated with the marker M of the marker pattern P2. A blue touch pen 2C illustrated in FIG. 4C is associated with the marker M of the marker pattern P3.

The marker M is a medium on which a marker pattern is defined. The marker pattern is a symbol, an image, or the like is associated with specific information. Alternatively, the marker M may be an AR marker, a one-dimensional code, a two-dimensional code, or the like. The marker M is disposed on (attached to) an input tool at a position where an image of the marker M can be captured by the cameras 30. At least one marker M is disposed on the input tool.

The marker pattern of the marker M may be recognizable by infrared cameras. For example, the marker M is a medium on which a marker pattern is defined by an infrared absorbing material that absorbs infrared rays. The marker pattern is defined by the contrast between an infrared absorption feature and an infrared reflection feature. In other words, the marker pattern of the marker M is defined by the difference between the infrared absorption feature and the infrared reflection feature. The marker pattern is defined, for example, with a material having an infrared absorption feature or an infrared reflection feature different from that of the base material. Note that absorption feature and the reflection feature are, specifically, absorptance and reflectance, respectively. In an ideal state, the sum of reflectance and absorptance is 100% ("reflectance+absorptance=100%"). Therefore, absorptance and the reflectance represent substantially the same concept in the sense that either one indicates the ratio of absorption to reflection. Regarding reflection, even with the same reflectance, the appearance may differ due to a difference in the reflection feature, i.e., irregular reflection or specular reflection. In general, a "contrast" is basically a significant difference between two objects disposed adjacent to each other. In a visual sense, a contract refers to a difference in color, brightness, luminance, shape, feeling, texture, etc., within the same visual field. In the description above, "The marker pattern is defined by the contrast between an infrared absorption feature and an infrared reflection feature" means that (1) the infrared absorption feature or the infrared reflection feature of the marker pattern and a different surrounding areas differ and thereby the marker pattern (shape, design, etc.) can be recognized by the contrast, and (2) the marker pattern contains two or more regions having different infrared absorption feature or infrared reflection features.

Figure 5:
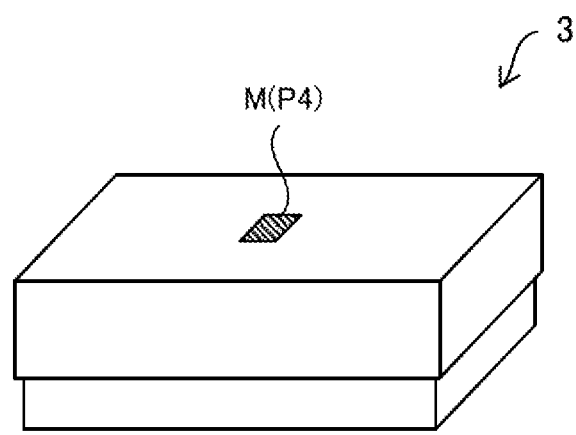
FIG. 5 illustrates an example configuration of an eraser according to an embodiment of the disclosure.

FIG. 5 illustrates the configuration of the eraser 3. The eraser 3 is provided with a marker M of the marker pattern P4, as illustrated in FIG. 5. The marker M of the marker pattern P4 is provided on at least one of the upper faces and the lower face of the eraser 3. Each input tool of the input system 100 is provided with a marker M each having an individual marker pattern.

Referring back to FIG. 2, the storage 20 of the input apparatus 1 further stores a control program 211, such as a handwriting input process for causing the controller 60 to execute a handwriting input process (see FIG. 6) described below. For example, the handwriting input program is stored on a non-transitory computer-readable recording medium, such as a compact disc (CD) or a digital versatile disc (DVD). The handwriting input program is read by a reading device (not illustrated), such as a CD drive or a DVD drive, of the input apparatus 1 and stored in the storage 20. Alternatively, the handwriting input program may be downloaded from a server accessible by the input apparatus 1 and stored in the storage 20.

The cameras 30 are digital cameras that capture images of a target and output the images as digital image data. The cameras 30 are examples of an image-capturing device according to the disclosure. For example, as illustrated in FIG. 1, the cameras 30 are disposed at the upper right edge and the upper left edge of the touch panel 10 and capture images of the entire front region of the input screen of the touch panel 10. Note that the depths of field of the cameras 30 are set in accordance with the size of the touch panel 10 to enable the cameras 30 to capture the entire front region. Any number of one or more cameras 30 may be provided.

It is desirable that the cameras 30 be infrared cameras. Such an infrared camera is not limited to a camera that captures images by selectively receiving infrared rays, and may be a camera that captures images by receiving at least infrared rays. The "infrared camera" according to the disclosure includes, for example, a camera that captures images by receiving both visible light and infrared rays (superimposing the visible light image and the infrared image). For example, a commercially available, typical visible-light camera includes an infrared-light removal filter and is able to receive only visible light. A simple "infrared light filter" can be realized by removing the infrared-light removal filter from the visible-light camera. The cameras 30 according to the present embodiment may be such simple infrared cameras. The cameras 30 may be known cameras.

In the present embodiment, the cameras 30 capture images of the marker M disposed on the touch pen 2 residing in an image-capturing region. For example, when a user performs a touch input operation on the input screen of the touch panel 10 using the touch pen 2 provided with the marker M of the marker pattern P1, the cameras 30 capture images of the marker M of the touch pen 2. Moreover, for example, when a user performs a touch input (erasing) operation on the input screen of the touch panel 10 using the eraser 3 provided with the marker M of the marker pattern P4, the cameras 30 capture images of the marker M of the eraser 3.

The infrared light emitters 40 are light emitters that realize an infrared touch panel. Each of the infrared light emitters 40 includes an infrared light-emitting element or a light emitting diode (LED). The infrared light receivers 50 are light receivers that realize an infrared touch panel. Each of the infrared light receivers 50 includes an infrared light-receiving element or a phototransistor. One of the infrared light emitters 40 and one of the infrared light receivers 50 are disposed along the X direction (the horizontal direction in FIG. 1), and the other one of the infrared light emitters 40 and the other one of the infrared light receivers 50 are disposed along the Y direction (the vertical direction in FIG. 1). When the touch pen 2 touches the input screen of the touch panel 10, the infrared rays emitted from the infrared light emitters 40 in the X direction and Y direction are blocked by the touch pen 2. The input apparatus 1 thereby detects the X coordinate and Y coordinate of the position of the touch pen 2.

The controller 60 includes control devices, such as a central processing unit (CPU), a read-only memory (ROM), and a random-access memory (RAM). The CPU is a processor that executes various arithmetic processes. The ROM is a non-volatile memory in which control programs, such as a basic input/output system (BIOS) and an operating system (OS), for causing the CPU to execute various arithmetic processes are preliminarily stored. The RAM is a volatile or non-volatile memory for storing various data items, and is used as a temporary memory (work area) for various processes executed by the CPU. The controller 60 controls the input apparatus 1 by causing the CPU to execute various control programs 211 preliminarily stored in the ROM or the storage 20.

In specific, the controller 60 includes various processing units, such as a coordinate detector 611, a captured-image acquirer 612, an input-tool identifier 613, and an input-data generator 614, as illustrated in FIG. 2. Note that the controller 60 causes the CPU to execute various processes in accordance with the handwriting input program, and thereby functions as the coordinate detector 611, the captured-image acquirer 612, the input-tool identifier 613, and the input-data generator 614. Some or all of the processing units of the controller 60 may include electronic circuits. Note that the handwriting input program may cause multiple processors to function as the various processing units.

The coordinate detector 611 detects position coordinates corresponding to the position of an input on the input screen of the touch panel 10 by an input tool, such as the touch pen 2 or the eraser 3. The coordinate detector 611 is an example of the coordinate detector according to the disclosure. In specific, the coordinate detector 611 detects the position at which the input tool contacts the touch panel 10 as the position coordinates of the input by the input tool on the input screen. The coordinate detector 611 detects the position coordinates of the input tool on the basis of the blocking state of the infrared rays by the infrared rays emitted from the infrared light emitter 40 and irradiating the input tool. In specific, the coordinate detector 611 detects the position coordinates (X coordinate, Y coordinate) of the touch pen 2 on the basis of a detection signal output from the infrared light receiver 50 when the infrared rays are blocked by the touch pen 2.

The captured-image acquirer 612 acquires images of the marker M captured by the cameras 30. The cameras 30 capture images of the marker M while the input tool is irradiated with infrared rays by the infrared rays emitted from the infrared light emitter 40. Since the marker M has a marker pattern defined by an infrared absorbing material, the marker M absorbs the infrared rays emitted from the infrared light emitter 40. As a result, the cameras 30 are able to reliably capture images of the marker pattern of the marker M. In this way, the infrared light emitter 40 functions as a light source for detecting the position coordinates of the input tool on the basis of the blocking state of the infrared rays by the input tool, and a light source for irradiating the marker M of the input tool with the infrared rays and capturing images with the camera 30. Therefore, it is desirable that the touch panel 10 according to the disclosure be an infrared type touch panel.

The input-tool identifier 613 identifies the attribute of the input tool on the basis of the images of the marker M captured by the cameras 30. The input-tool identifier 613 is an example of the input-tool identifier according to the disclosure. In specific, the input-tool identifier 613 identifies the attribute of the input tool associated with the marker pattern of the marker M included in the captured image acquired by the captured-image acquirer 612. For example, when the captured images acquired by the captured-image acquirer 612 include the marker M of the touch pen 2A (see FIG. 4A), the input-tool identifier 613 refers to the attribute information 212 (see FIG. 3) and identifies the writing color associated with marker pattern P1 of marker M to be "black." Besides, for example, when the captured images acquired by the captured-image acquirer 612 include the marker M of the eraser 3 (see FIG. 5), the input-tool identifier 613 refers to the attribute information 212 (see FIG. 3) and identifies the type of the input tool associated with marker pattern P4 of marker M to be "eraser."

The input-data generator 614 generates input data (writing data) of the input tool on the basis of the position coordinates detected by the coordinate detector 611 and the attribute identified by the input-tool identifier 613. The input-data generator 614 is an example of the input-data generator according to the disclosure. The controller 60 defines information on the display panel on the basis of the input data. For example, the controller 60 defines (displays) the handwriting information (for example, characters) corresponding to the touch input by the touch pen 2 at a position corresponding to the position coordinates of the display panel in the writing color identified by the input-tool identifier 613. In this way, it possible to display handwriting information corresponding to the input data on the display panel in real time.

For example, when a printing process is executed by a color printer (not illustrated) on the basis of the input data (writing data), writing reflecting the writing color, and the thickness and shape of the tip of the pen is printed on a printing paper.

Handwriting Input Process

Figure 6:
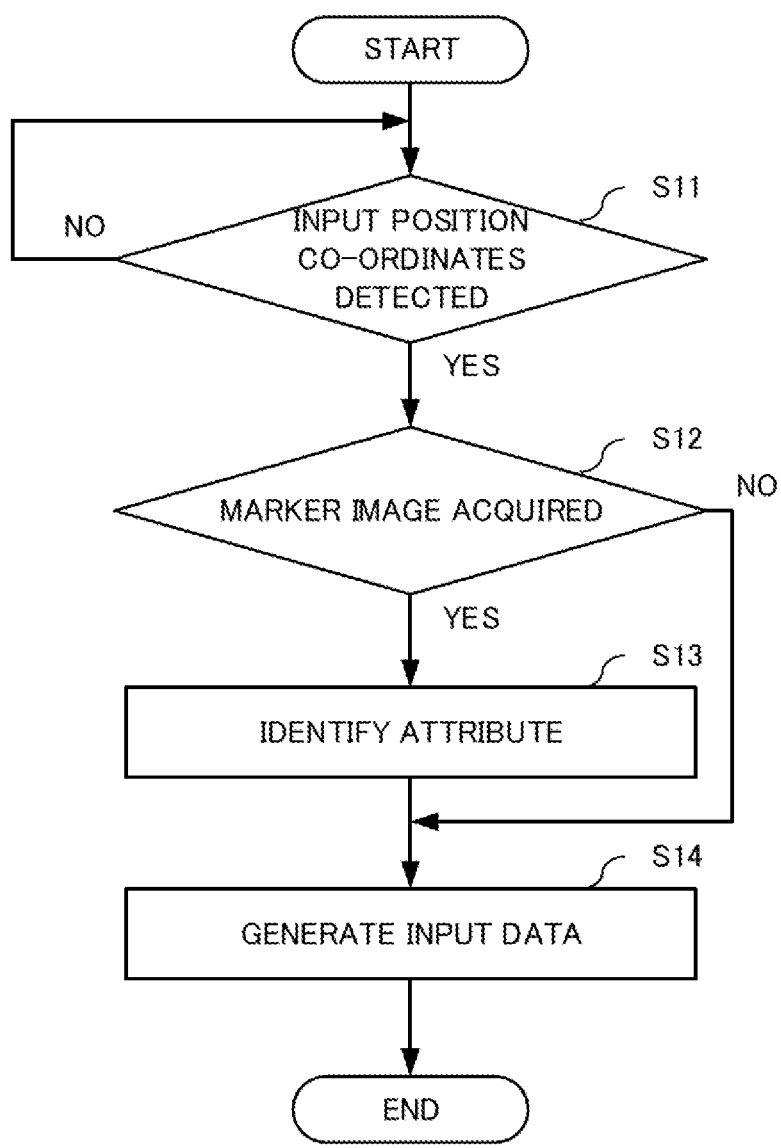
FIG. 6 is a flowchart illustrating an example of a handwriting input process executed in the input system according to an embodiment of the disclosure.

A handwriting input process executed by the controller 60 of the input apparatus 1 will now be described with reference to FIG. 6.

Note that the disclosure can be considered as an invention of a handwriting input method of executing one or more steps included in the handwriting input process. The one or more steps included in the handwriting input process may be appropriately be omitted. Note that the steps in the handwriting input process may be executed in different orders as long as the same effect is achieved. A case in which each step of the handwriting input process is executed by the controller 60 will be described as an example. However, a handwriting input method in which each step of the handwriting input process is executed in a distributed manner by multiple processors may also be considered as another embodiment.

In step S11, the controller 60 determines whether the position coordinates of a touch input by the touch pen 2 on the input screen of the touch panel 10 are detected. If the position coordinates are detected by the controller 60, the process proceeds to step S12.

In step S12, the controller 60 determines whether the captured images of the marker M disposed on the input tool (for example, the touch pen 2) have been acquired from the cameras 30. If the captured images of the marker M are acquired by the controller 60 (step S12: YES), the process proceeds to step S13. If no captured images of the marker M are acquired by the controller 60 (step S12: NO), the process proceeds to step S14.

In one case, the marker M may not be readily captured by the cameras 30, for example, due to the use state of the input tool of the user, the emission state of infrared rays, etc. In order to cope with such a situation, the controller 60 may continuously execute, for a predetermined time, a process of determining whether captured images of the marker M have been acquired from the cameras 30, for example. In such a configuration, if the controller 60 does not acquire the captured images of the marker M from the cameras 30 within a predetermined time, the process proceeds to step S14.

In step S13, the controller 60 identifies the attribute of the input tool on the basis of the captured images of the marker M. For example, the controller 60 identifies the writing color (see FIG. 3) associated with the marker pattern of the marker M disposed on the touch pen 2 in the captured images.

In step S14, the controller 60 generates input data corresponding to the input by the input tool. In specific, if the marker M of the input tool is recognized (step S12: YES), the controller 60 generates input data corresponding to the input by the input tool on the basis of the position coordinates and the attribute of the input tool. The controller 60 defines information on the display panel on the basis of the input data. For example, the controller 60 defines (displays) the handwriting information (for example, characters) corresponding to the touch input by the touch pen 2 in the writing color at a position corresponding to the position coordinates.

If the marker M of the input tool is not recognized (step S12: NO), the controller 60 generates input data corresponding to the input by the input tool on the basis of the position coordinates, and defines information on the display panel on the basis of the input data. For example, the controller 60 defines (displays), on the display panel, the handwriting information (for example, characters) corresponding to the touch input by the touch pen 2 at a position corresponding to the position coordinates. In such a case, the controller 60 defines the handwriting information in accordance with the default attributes (writing color, thickness of the tip of the pen, and shape of the tip of the pen). As described above, the handwriting input process is executed.

As described above, the input apparatus 1 according to the present embodiment captures images of the marker M disposed on an input tool with the cameras 30 to acquire the attributes of the input tool associated with the marker M, and generates input data corresponding to the input by the input tool on the basis of the attributes and the position of the input tool input to the touch panel 10. In this way, images of the marker M disposed on the input tool can be captured to identify the attributes of the input tool. This enables accurate determination of the type of the input tool through a simple configuration.

In the input apparatus 1 according to the present embodiment, the touch panel 10 is an infrared touch panel including an infrared light emitter 40 and an infrared light receiver 50, the cameras 30 are infrared cameras, and the markers M are media on which marker patterns are defined by an infrared absorbing material. According to such a configuration, the cameras 30 capture images of the marker M while the marker M is irradiated with the infrared rays by the infrared rays emitted from the infrared light emitter 40. This enables the cameras 30 to certainly capture images of the marker M, and can thereby increase the recognition accuracy of the marker pattern of the marker M.

The disclosure is not limited to the embodiments described above. For example, the input apparatus 1 may detect position coordinates on the input screen on the basis of images of the input tool captured by the cameras 30. In such a case, the input screen is not limited to that of the touch panel 10. For example, the input screen may be a contact surface of a non-electronic device, such as a desk surface or a wall surface, or may be a virtual non-contact surface represented in a space. That is, the touch panel 10 in the input apparatus 1 may be omitted.

As described above, the input screen may be a board, such as a white board or a blackboard. In the case where the input screen is a board, it is possible to write characters directly on the board with a pen or erase characters on the board with an eraser. In such a configuration, for example, the pen and the eraser can be those commercially available. In such a case, markers M may be attached to the pen and the eraser to realize the input tool according to the present embodiment.

In another embodiment, the marker M on the input tool may be covered with an infrared transmitting material. For example, the marker M may be covered with a cover made of a resin material that transmits infrared rays. In this way, it is possible to prevent damage to the marker M due to use of the input tool while maintaining the recognition accuracy of the marker pattern of the marker M. It is preferable that the infrared transmitting material have a property of blocking visible light. In this way, visible light can be blocked, and thereby the marker M can be efficiently irradiated with the infrared light emitted from the infrared light emitter 40. This can increase the recognition accuracy of the marker pattern.

In another embodiment, the marker M may be detachable from the input tool. In this way, it possible to readily attach and remove the marker M from the input tool in the case of use of a commercially available input tool, such as a marker pen. It is also possible to change the attributes of the input tool by changing the marker M to one having a different marker pattern. When the marker M is damaged, it can be readily replaced with a new marker M.

A specific configuration for attaching markers M to an input tool will now be described. The input tool is exemplified by a touch pen 2 in the description.

Figure 7:
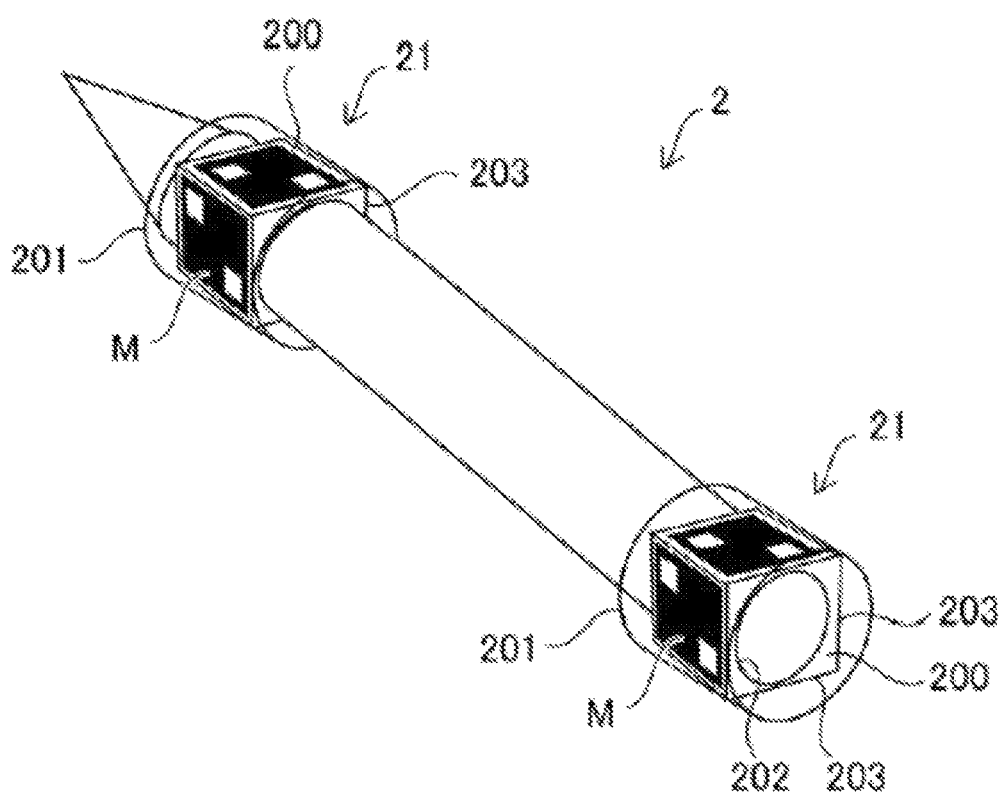
FIG. 7 is a perspective view of the configuration of a touch pen and marker attaching tools according to an embodiment of the disclosure.

FIG. 7 is a perspective diagram illustrating a configuration example of the touch pen 2 to which the marker M is attached. As illustrated in FIG. 7, the touch pen 2 includes marker attaching tools 21. The touch pen 2 may include one or more sign attaching tools 21. For example, as illustrated in FIG. 7, the touch pen 2 includes one marker attaching tool 21 near a first end of the pen on a tip side thereof and one marker attaching tool 21 near a second end of the pen opposite to the first end.

The marker attaching tool 21 each includes a body 200 and covers 201 covering the body 200. The body 200 has an insertion section 202 and flat regions 203. The insertion section 202 extends along the inner side of the body 200. The flat regions 203 are disposed on the outer side of the body 200. The touch pen 2 is passed through the insertion section 202. That is, the insertion section 202 is formed in the body 200 in the extending direction or the axial direction of the touch pen 2. When the touch pen 2 is inserted into the insertion section 202, the marker attaching tool 21 is attached to the touch pen 2. In this way, the marker attaching tool 21 is attached to the touch pen 2 in a detachable manner.

Figure 8:
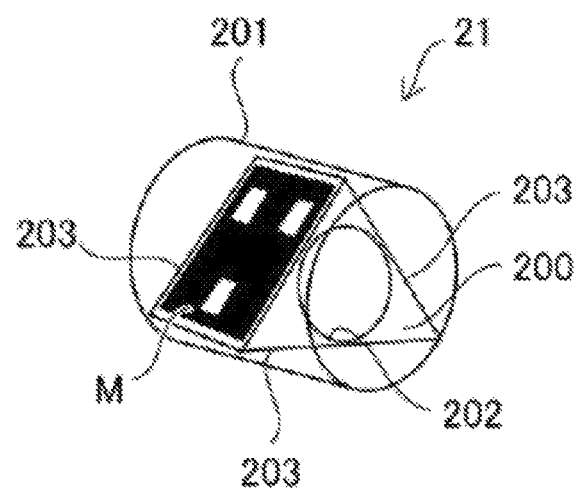
FIG. 8 is a perspective view of the configuration of a marker attaching tool according to an embodiment of the disclosure.

The flat regions 203 surround the outer circumference of the body 200. In the example illustrated in FIG. 7, the flat regions 203 are formed on four peripheral faces of the body 200. That is, the flat regions 203 are arranged so as to surround the outer circumferential face of the touch pen 2. The number of flat regions 203 is not limited. For example, four flat regions 203 may be disposed on four faces as illustrated in FIG. 7; three flat regions 203 may be disposed on three faces as illustrated in FIG. 8; or five or more flat regions 203 may be disposed on five or more faces (not illustrated).

The flat regions 203 each has, for example, a rectangular shape and is provided with a marker M. In the example illustrated in FIG. 7, four markers M are attached to each marker attaching tool 21. Thus, the touch pen 2 is provided with a total of eight markers M. The same attributes (for example, writing color) are associated with each marker M. The markers M may be bonded to the flat regions 203 with an adhesive agent or the like, or may be printed on the flat regions 203. In this way, the markers M can be held flat, and thereby the recognition accuracy of the marker pattern can be increased.

The covers 201 are disposed so as to cover the markers M. The covers 201 are formed of a resin material (infrared transmitting material) that blocks visible light and transmits infrared light. In this way, it is possible to efficiently irradiate the markers M with the infrared rays emitted from the infrared light emitter 40. This can increase the recognition accuracy of the marker pattern of the markers M, and prevent the markers M from being damaged by the use of the touch pen 2.

According to the above configuration, the markers M are attached to the multiple flat regions 203. This prevents all markers M from being hidden by the user's hand or the like while the touch pen 2 is being used. For this reason, the cameras 30 are able to certainly recognize the markers M on the touch pen 2.

In the case where multiple marker attaching tools 21 are fixed to the touch pen 2, as illustrated in FIG. 7, the fixing angles of the marker attaching tools 21 (for example, the angles around the axis of the touch pen 2) may be different from each other. In specific, the marker attaching tools 21 may be so fixed that the direction of an axis perpendicular to the flat face of a flat region 203 of the marker attaching tool 21 disposed on the first end side differs from the direction of an axis perpendicular to the flat face of a different flat region 203 of the marker attaching tool 21 disposed on the second end side, for example, the axes may be disposed at a 45-degree angle therebetween. In this way, even when the marker M of one of the markers attaching tools 21 is disposed at a position where the marker M is not readily recognized by the cameras 30, the marker M of the other one of the markers attaching tools 21 can be recognized by the cameras 30.

Figure 9:
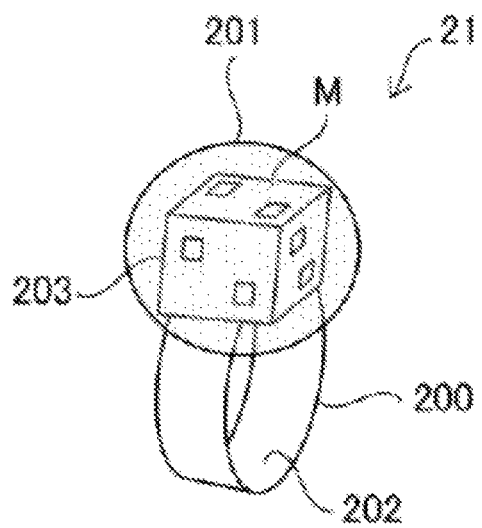
FIG. 9 is a perspective view of the configuration of a marker attaching tool according to an embodiment of the disclosure.

The configuration of the marker attaching tools 21 is not limited to that described above. For example, the marker attaching tools 21 may have any configuration illustrated in FIGS. 9 to 12. In a marker attaching tool 21 illustrated in FIG. 9, flat regions 203 are disposed on a portion of a body 200. The flat regions 203 are disposed on three faces of a body 200 other than the face adjacent to the body 200. Markers M are attached to the flat regions 203. The marker attaching tool 21 is fixed to the touch pen 2 by the touch pen 2 being passed through the insertion section 202. A cover 201 is disposed so as to cover the markers M on the flat regions 203. Regions of the body 200 without markers M need not to be covered with the cover 201.

Figure 10:
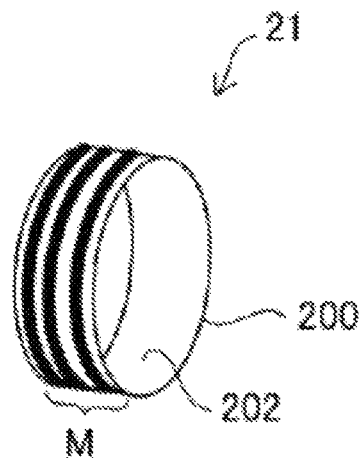
FIG. 10 is a perspective view of the configuration of a marker attaching tool according to an embodiment of the disclosure.

Alternatively, markers M may be disposed along the outer circumferential face of a body 200, as illustrated in FIG. 10. In the configuration illustrated in FIG. 10, no flat regions 203 are provided on the marker attaching tool 21, and the markers M are attached to the body 200. Note that, in the case where the outer circumferential face of the body 200 is a curved surface, it is desirable that the markers M include marker patterns covering the curved outer circumferential face so as to prevent a decrease in the recognition accuracy of the markers M.

Figure 11:
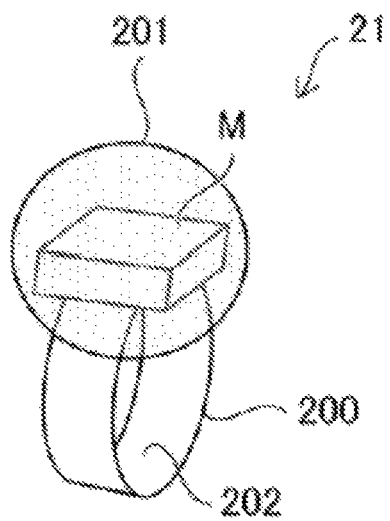
FIG. 11 is a perspective view of the configuration of a marker attaching tool according to an embodiment of the disclosure.
Figure 12:
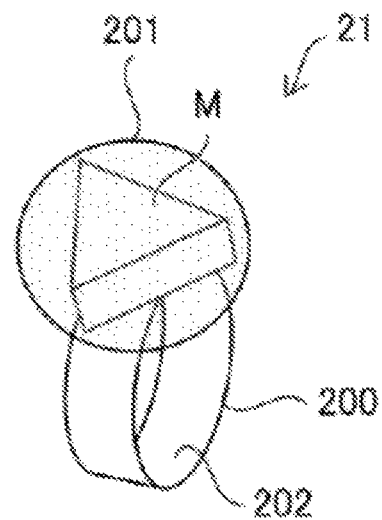
FIG. 12 is a perspective view of the configuration of a marker attaching tool according to an embodiment of the disclosure.
Figure 13:
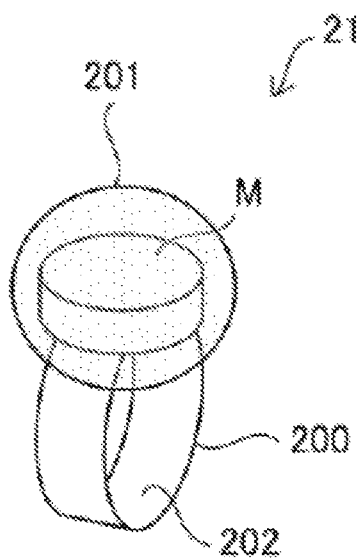
FIG. 13 is a perspective view of the configuration of a marker attaching tool according to an embodiment of the disclosure.

Alternatively, a marker M may include a marker pattern identifiable by it shape, as illustrated in FIGS. 11 to 13. For example, a rectangular marker M is attached to the marker attaching tool 21 illustrated in FIG. 11. For example, a black writing color is associated with the rectangular marker M. For example, a triangular marker M is attached to the marker attaching tool 21 illustrated in FIG. 12. For example, a red writing color is associated with the triangular marker M. For example, a circular marker M is attached to the marker attaching tool 21 illustrated in FIG. 13. For example, a blue writing color is associated with the circular marker M. In this way, the input-tool identifier 613 identifies the attribute (writing color) of the touch pen 2 on the basis of the shape (rectangle, triangle, circle, etc.) of the marker M in the images captured by the cameras 30.

The marker attaching tool 21 illustrated in FIGS. 7 to 13 has a structure that allows the marker attaching tool 21 to be detachable from the input tool. Hence, the marker attaching tool 21 may be used while, for example, being fit on the user's finger. For example, the user fits the marker attaching tool 21 illustrated in FIG. 9 to the user's index finger and touches the touch panel 10 with the index finger. In this way, the marker M can be recognized to define an image in accordance with a predetermined attribute. Note that the body 200 has a shape corresponding to the input tool. In this way, for example, the marker attaching tool 21 can be attached to an eraser 3.

Figure 14:
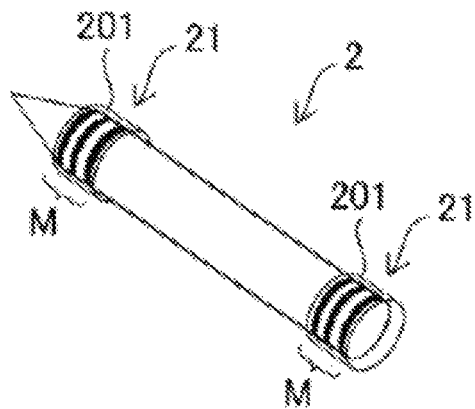
FIG. 14 is a perspective view of the configuration of a touch pen and marker attaching tools according to an embodiment of the disclosure.
Figure 15:
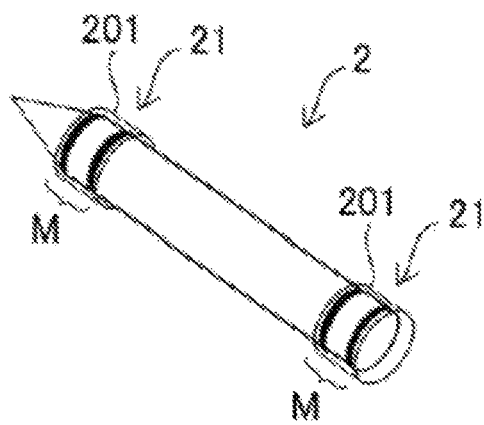
FIG. 15 is a perspective view of the configuration of a touch pen and marker attaching tools according to an embodiment of the disclosure.
Figure 16:
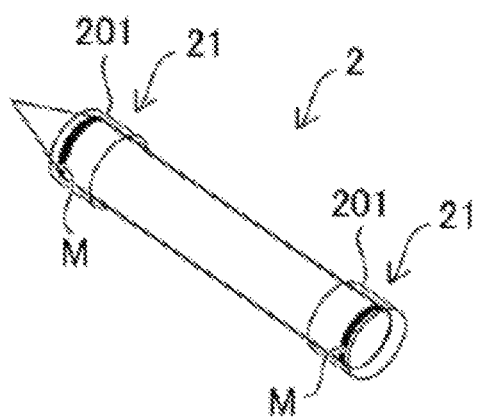
FIG. 16 is a perspective view of the configuration of a touch pen and marker attaching tools according to an embodiment of the disclosure.

The marker attaching tool 21 may have any configuration illustrated in FIGS. 14 to 16. In specific, the marker attaching tool 21 may be integrated with the touch pen 2. That is, the marker attaching tool 21 may be a component of the touch pen 2. For example, a marker attaching tool 21 is disposed near a first end of the touch pen 2 on the tip side thereof, and a different marker attaching tool 21 is disposed near a second end of the touch pen 2 opposite to the first end. Markers M are attached to the marker attaching tools 21 by printing or the like. Note that, in the case where the touch pen 2 has a cylindrical shape, it is desirable that the markers M include marker patterns covering the cylindrical outer face of the touch pen 2. The markers M illustrated in FIG. 14 include marker patterns associated with, for example, a black pen. The markers M illustrated in FIG. 15 include marker patterns associated with, for example, a red pen. The markers M illustrated in FIG. 16 include marker patterns associated with, for example, a blue pen. Note that, covers 201 covering the markers M may be disposed on the marker attaching tools 21. According to the configurations illustrated in FIGS. 14 to 16, the touch pen 2 can be reduced in size.

An input system 100 according to another embodiment may switch the input mode before performing the input process. The input modes may include an input mode of input (writing) by a touch pen 2, an input mode of the input (erasing of writing) by an eraser 3, and an input mode of input by a different input tools (brush, etc.). For example, each of the input tools (the touch pen 2, the eraser 3, a brush, etc.) is assigned one of multiple input modes (a pen input mode, an eraser input mode, a brush input mode, etc.). In such a case, the attribute is information on the input mode assigned to each input tool. In this way, the input system 100 performs an input process in accordance with the input mode identified by the input-tool identifier 613. In this way, it is possible to appropriately identify the type of input tool when input tools of different types are being used.

The disclosure can be realized through a handwriting input method (an input method), as described above. In such a case, the handwriting input method is executed by at least one processor. The handwriting input method includes coordinate detecting of detecting position coordinates of an input on an input screen by an input tool, image-capturing of capturing an image of a marker indicating information on the attribute of the input tool, input-tool identifying of identifying the attribute on basis of the image of the marker captured in the image-capturing step, and input-data generating of generating input data of the input tool on the basis of the position coordinates detected in the coordinate detecting and the attribute identified in the input-tool identifying.

There may be various modifications of the invention besides those described above. Such modifications should not be construed as falling outside the scope of the invention. The invention should include the meaning equivalent to the claims and all modifications within the scope.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

What is claimed is:

1. An input apparatus including a touch panel that receives an input on the touch panel by an input tool, the input apparatus comprising:

a light emitter that is disposed along a first side of the touch panel and emits infrared light;

a light receiver that is disposed along a second side of the touch panel and receives the infrared light emitted from the light emitter, the first side and the second side opposite to each other;

a coordinate detector that detects position coordinates on the touch panel receiving the input by the input tool;

an infrared camera that captures an image of a marker disposed on the input tool, the marker indicating information on an attribute of the input tool, a marker pattern being defined by a contrast between a feature absorbing infrared light or a feature reflecting infrared light;

an input-tool identifier that identifies the attribute based on the image of the marker captured by the infrared camera; and an input-data generator that generates input data of the input tool based on the position coordinates detected by the coordinate detector and the attribute identified by the input-tool identifier, wherein in a state where the input tool is irradiated with the infrared light emitted from the light emitter, (i) the coordinate detector detects a position coordinate of the input tool based on a position at which the infrared light is blocked by the input tool, and (ii) the infrared camera captures the image of the marker, and the light emitter functions as a light source for detecting the position coordinate of the input tool, and as a light source for irradiating the marker with the infrared light and capturing the image of the marker with the infrared camera.

2. The input apparatus according to claim 1, wherein the marker includes the marker pattern defined by an infrared absorbing material that absorbs the infrared light.

3. The input apparatus according to claim 1, wherein the marker on the input tool is covered with an infrared transmitting material.

4. The input apparatus according to claim 3, wherein the infrared transmitting material includes a property of blocking visible light.

5. The input apparatus according to claim 1, wherein the marker is detachably attached to the input tool.

6. The input apparatus according to claim 1, wherein the input tool is assigned one of a various types of input modes, the attribute includes information on the various types of input modes assigned to the input tool, and the input-data generator generates the input data by the various types of input modes identified by the input-tool identifier.

7. The input apparatus according to claim 1, wherein the input tool includes a pen, and the attribute includes information on at least one of input color of the pen, thickness of a tip of the pen, and shape of the tip of the pen.

8. The input apparatus according to claim 1:

wherein the coordinate detector detects a position at which the input tool contacts the touch panel as the position coordinates on the touch panel receiving the input by the input tool.

9. The input apparatus according to claim 1, wherein the input tool includes a marker attaching tool, at least a portion of the marker attaching tool having a flat region, and the marker is attached to the flat region of the marker attaching tool.

10. The input apparatus according to claim 9, wherein the marker attaching tool includes a plurality of the flat regions, and the marker is attached to each of the plurality of the flat regions.

11. The input apparatus according to claim 10, wherein the input tool includes a pen, and the plurality of the flat regions are disposed to surround an outer circumference of the pen.

12. The input apparatus according to claim 9, wherein the input tool includes a plurality of the marker attaching tools, and the marker is attached to each of the plurality of the marker attaching tools.

13. The input apparatus according to claim 9, wherein the marker attaching tool is detachably attached to the input tool.

14. The input apparatus according to claim 9, wherein the marker attaching tool is integrated with the input tool.

15. The input apparatus according to claim 9, wherein the marker attaching tool and the marker attached to the marker attaching tool are covered with an infrared transmitting material.

16. The input apparatus according to claim 9, wherein the input tool includes a pen, and the marker attaching tool is attached near a first end of the pen on a tip side thereof and attached near a second end of the pen opposite to the first end.

17. The input apparatus according to claim 1, wherein the input tool includes a cylindrical marker attaching tool, and the marker is attached to the marker attaching tool to surround the marker attaching tool.

18. An input system including an input tool and an input apparatus that has a touch panel for receiving an input on the touch panel by the input tool, the input system comprising:

a light emitter that is disposed along a first side of the touch panel and emits infrared light;

a light receiver that is disposed along a second side of the touch panel and receives the infrared light emitted from the light emitter, the first side and the second side opposite to each other;

a coordinate detector that detects position coordinates on the touch panel receiving the input by the input tool;

an infrared camera that captures an image of a marker disposed on the input tool, the marker indicating information on an attribute of the input too, a marker pattern being defined by a contrast between a feature absorbing infrared light or a feature reflecting infrared light;

an input-tool identifier that identifies the attribute based on the image of the marker captured by the infrared camera; and an input-data generator that generates input data of the input tool based on the position coordinates detected by the coordinate detector and the attribute identified by the input-tool identifier, wherein in a state where the input tool is irradiated with the infrared light emitted from the light emitter, (i) the coordinate detector detects a position coordinate of the input tool based on a position at which the infrared light is blocked by the input tool, and (ii) the infrared camera captures the image of the marker, and the light emitter functions as a light source for detecting the position coordinate of the input tool, and as a light source for irradiating the marker with the infrared light and capturing the image of the marker with the infrared camera.

* * * * *